United States Patent
Aoki et al.

(10) Patent No.: US 10,040,936 B2
(45) Date of Patent: Aug. 7, 2018

(54) POLYCARBONATE RESIN MOLDING MATERIAL FOR ARTICLES TO BE COATED, MOLDED ARTICLE AND COATED MOLDED ARTICLE

(71) Applicant: IDEMITSU KOSAN CO., LTD., Tokyo (JP)

(72) Inventors: Yusuke Aoki, Chiba (JP); Yoshio Okamoto, Chiba (JP); Tsuyoshi Murakami, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 64 days.

(21) Appl. No.: 15/127,684

(22) PCT Filed: Mar. 11, 2015

(86) PCT No.: PCT/JP2015/057127
§ 371 (c)(1),
(2) Date: Sep. 20, 2016

(87) PCT Pub. No.: WO2015/151742
PCT Pub. Date: Oct. 8, 2015

(65) Prior Publication Data
US 2017/0145211 A1    May 25, 2017

(30) Foreign Application Priority Data

Mar. 31, 2014 (JP) .................. 2014-073522

(51) Int. Cl.
*C08L 69/00* (2006.01)
*C08J 7/06* (2006.01)

(52) U.S. Cl.
CPC ............... *C08L 69/00* (2013.01); *C08J 7/065* (2013.01); *C08J 2369/00* (2013.01); *C08L 2205/025* (2013.01); *C08L 2205/03* (2013.01); *C08L 2205/035* (2013.01)

(58) Field of Classification Search
USPC ....................................... 428/412
See application file for complete search history.

(56) References Cited

U.S. PATENT DOCUMENTS

| | | | |
|---|---|---|---|
| 2007/0179233 A1 | 8/2007 | Isozaki et al. | |
| 2009/0036593 A1 | 2/2009 | Derudder et al. | |
| 2009/0124749 A1 | 5/2009 | Steendam et al. | |
| 2014/0179817 A1* | 6/2014 | Morizur .............. | C08G 64/045 521/180 |

FOREIGN PATENT DOCUMENTS

| | | |
|---|---|---|
| CN | 101809085 A | 8/2010 |
| JP | H04-285655 A | 10/1992 |
| JP | 2001-247742 A | 9/2001 |
| JP | 2002-012755 A | 1/2002 |
| JP | 2002-220527 A | 8/2002 |
| JP | 2006-124645 A | 5/2006 |
| JP | 2006-199743 A | 8/2006 |
| JP | 2012-211330 A | 11/2012 |
| JP | 2013-064045 A | 4/2013 |
| JP | 2013-064046 A | 4/2013 |
| JP | 2013-112737 A | 6/2013 |
| JP | 2013-139516 A | 7/2013 |
| WO | WO-2012/058821 | 5/2012 |
| WO | WO-2013/081161 A1 | 6/2013 |

OTHER PUBLICATIONS

Extended European Search Report issued in EP Patent Application No. 15774206.5 dated Oct. 27, 2017.
International Search Report issued in International Patent Application No. PCT/JP2015/057127 dated May 26, 2015.
Manual for Coating Technician, Bejing City Worker's Technical Association, Mechanical Industry Press.

* cited by examiner

*Primary Examiner* — Terressa M Boykin
(74) *Attorney, Agent, or Firm* — Foley & Lardner LLP

(57) ABSTRACT

Provided is a polycarbonate resin molding material for articles to be coated, containing a polycarbonate resin (A) containing a polycarbonate-polyorganosiloxane copolymer (A-1) having a specific structure, and a copolymer (B) having a constituent unit derived from butadiene, and a content of the polyorganosiloxane block moiety in entirety of the molding material is in the range of 0.50 to 10% by mass and a content of the constituent unit derived from butadiene in entirety of the molding material is in the range of 1 to 10% by mass.

9 Claims, No Drawings

POLYCARBONATE RESIN MOLDING MATERIAL FOR ARTICLES TO BE COATED, MOLDED ARTICLE AND COATED MOLDED ARTICLE

CROSS-REFERENCE TO RELATED APPLICATIONS

The present application is a U.S. national stage application of International Patent Application No. PCT/JP2015/057127, filed Mar. 11, 2015, which claims the benefit of priority to Japanese Patent Application No. 2014-073522, filed Mar. 31, 2014, the entireties of which are hereby incorporated by reference.

TECHNICAL FIELD

The present invention relates to a polycarbonate resin molding material for articles to be coated, a molded article, and a coated molded article.

BACKGROUND ART

A polycarbonate resin is tough and is excellent in a shock resistance and electric properties, and in addition, a molded article obtained therefrom is excellent in a size stability and so forth, so that it is expected to be widely used in various fields such as an electric and electronic equipment field and an automobile field. For example, it is being widely used as a raw material resin for production of a housing of electric and electronic equipment, an automobile part, or a precision molded part.

Especially in the use of an automobile part, because reduction of an exhaust gas and energy saving can be expected by lightening, resin-based materials including a polycarbonate resin are being widely used. When it is used in an automobile exterior part, in view of safety at the time of automobile collision, a high shock resistance is required. For example, Patent Literatures 1 and 2 disclose a polycarbonate resin composition having excellent surface hardness, shock resistance, and transparency in which two polycarbonate resins each having specific structure unit and specific molecular weight are contained and physical properties thereof such as DuPont impact strength are within a prescribed range.

However, there has been a problem that when a coating material is applied to a resin-based material having a high shock resistance such as a polycarbonate resin so as to give a high quality appearance, a shock resistance inherently owned by the resin-based material deteriorates dramatically. It is presumed that the deterioration of the shock resistance is caused by dissolution of a resin which constitutes the resin-based material by a solvent in the coating material, or some other reasons like this.

Accordingly, Patent Literature 3 proposes a primer paint which contains a solvent belonging to a group consisting of an ester-based solvent, an aromatic hydrocarbon-based solvent, a ketone-based solvent, and ethylene glycol monobutyl ether with the total amount thereof being less than a certain value, these solvents bringing about a bad effect by dissolving a resin which constitutes the resin-based material; and also it proposes a coated product in which the said primer paint is coated onto a base material formed of a polycarbonate polymer alloy and the like.

Patent Document 3 discloses a method to remedy the deterioration of the shock resistance of the resin-based material by improving the coating material, the said deterioration being caused by coating. However, a polycarbonate resin molding material having, independent of the kind of the used coating materials, not only a high shock resistance after the coating but also an excellent coating film adhesion has been wanted.

PRIOR ART LITERATURE

Patent Literature

PTL 1: Japanese Patent Laid-Open Publication No. 2013-64045
PTL 2: Japanese Patent Laid-Open Publication No. 2013-64046
PTL 3: Japanese Patent Laid-Open Publication No. 2006-124645

SUMMARY OF INVENTION

Problems to be Solved by the Invention

The present invention has an object to provide: a polycarbonate resin molding material for articles to be coated, which has an excellent coating film adhesion without causing significant deterioration of a shock resistance even after a coating is made thereto; a molded article containing the same; and a coated molded article.

Means for Solving the Problems

Inventors of the present invention found, as a result of an extensive investigation, that when a molding material, wherein the said material contains a polycarbonate resin (A) containing a polycarbonate-polyorganosiloxane copolymer and a copolymer (B) containing a constituent unit derived from butadiene and contents of each of a polyorganosiloxane block moiety and the constituent unit derived from butadiene are within certain ranges in the molding material, was used, there was no significant deterioration of a shock resistance even after the obtained molded article was coated, and that yet the molding material had an excellent coating film adhesion. On the basis of this finding, the present invention could be completed.

That is, the present invention relates to the following aspects [1] to [11].

[1]
A polycarbonate resin molding material for articles to be coated, containing:
a polycarbonate resin (A) containing a polycarbonate-polyorganosiloxane copolymer (A-1) which has a polycarbonate block consisting of a repeating unit represented by the following general formula (I) and a polyorganosiloxane block containing a repeating unit represented by the following general formula (II); and
a copolymer (B) having a constituent unit derived from butadiene,
wherein a content of the polyorganosiloxane block moiety in entirety of the molding material is in the range of 0.50 to 10% by mass and a content of the constituent unit derived from butadiene in entirety of the molding material is in the range of 1 to 10% by mass.

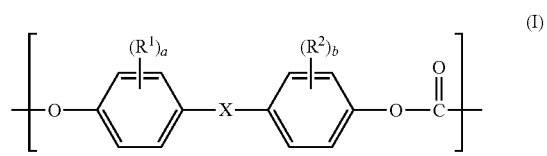

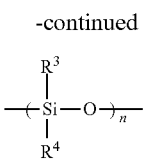

[In the formulae, $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—; $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms; a and b each independently represent an integer of 0 to 4; and n represents an average repeating number.]

[2] The polycarbonate resin molding material for articles to be coated according to [1], wherein a content of the polyorganosiloxane block moiety containing the repeating unit represented by the general formula (II) in the (A-1) component is in the range of 0.75 to 15% by mass.

[3] The polycarbonate resin molding material for articles to be coated according to [1] or [2], wherein the (B) component contains at least one kind selected from a copolymer (B-1) having a constituent unit derived from butadiene, acrylonitrile, and styrene but not having a constituent unit derived from methyl methacrylate, and a copolymer (B-2) having a constituent unit derived from butadiene and methyl methacrylate.

[4] The polycarbonate resin molding material for articles to be coated according to [3], wherein the (B-1) component is acrylonitrile-butadiene-styrene terpolymer (ABS).

[5] The polycarbonate resin molding material for articles to be coated according to [3] or [4], wherein the (B-2) component is at least one kind selected from methyl methacrylate-butadiene-styrene terpolymer (MBS) and methyl methacrylate-butadiene bipolymer (MB).

[6] The polycarbonate resin molding material for articles to be coated according to any one of [3] to [5], wherein the (B) component contains the (B-1) component and the (B-2) component, and a content of the (B-1) component is in the range of 8 to 100 parts by mass and a content of the (B-2) component is in the range of more than 0 part by mass to 25 or less parts by mass, the both contents being relative to 100 parts by mass of the (A) component.

[7] A molded article containing the polycarbonate resin molding material for articles to be coated according to any one of [1] to [6].

[8] A coated molded article, wherein a coating is made onto the molded article according to [7].

[9] The coated molded article according to [8], wherein the coating is made by using a coating material containing an organic solvent.

[10] The coated molded article according to [9], wherein the organic solvent is at least one kind selected from a ketone-based solvent and an ester-based solvent.

[11] The coated molded article according to any one of [8] to [10], wherein in a test piece having a thickness of 1 mm, number of the test piece having a crack formed therein is 1 or less when a falling weight impact test is carried out for 5 times under conditions of temperature of 23° C., an impact head diameter of 12.7 mm, a receiving block diameter of 48 mm, a falling weight of 500 g, and a falling height of 100 cm.

Advantageous Effects of Invention

According to the present invention, what can be provided are: a polycarbonate resin molding material for articles to be coated having an excellent coating film adhesion without causing significant deterioration of a shock resistance even after a coating is made thereto; a molded article; and a coated molded article.

MODES FOR CARRYING OUT THE INVENTION

[Polycarbonate Resin Molding Material for Articles to be Coated]

The polycarbonate resin molding material for articles to be coated according to the present invention is characterized in that the molding material contains a polycarbonate resin (A) containing a polycarbonate-polyorganosiloxane copolymer (A-1) which has a polycarbonate block consisting of a repeating unit represented by the following general formula (I) and a polyorganosiloxane block containing a repeating unit represented by the following general formula (II); and a copolymer (B) having a constituent unit derived from butadiene, and a content of the polyorganosiloxane block moiety in entirety of the molding material is in the range of 0.50 to 10% by mass and a content of the constituent unit derived from butadiene in entirety of the molding material is in the range of 3 to 10% by mass.

It should be noted that in the present invention, the term "polycarbonate resin molding material for articles to be coated" means a polycarbonate resin molding material with which a molded article that is a coated product applied with various coatings can be obtained. In addition, in the present invention, the term "coating" means a concept including not only various coatings such as a roll coating, a curtain flow coating, a soaking method, a spray coating, an electrostatic coating, an electrodeposition coating, and a UV coating, but also plating, vapor deposition, and the like.

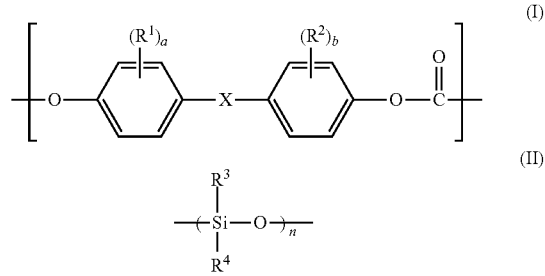

[In the formulae, $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—; R$^3$ and R$^4$ each independently represent a hydrogen atom, a halogen atom, an alkyl group having 1 to 6 carbon atoms, an alkoxy group having 1 to 6 carbon atoms, or an aryl group having 6 to 12 carbon atoms; a and b each independently represent an integer of 0 to 4; and n represents an average repeating number.]

[Polycarbonate Resin (A)]

The polycarbonate resin (A) to be used in the present invention (hereinafter, this is sometimes referred to as "(A) component") is characterized by that in view of avoiding deterioration of a shock resistance of the obtained molded article after coating, the polycarbonate resin contains therein a polycarbonate-polyorganosiloxane copolymer (A-1) (hereinafter, this is sometimes referred to as "PC-POS (A-1)" or "(A-1) component"). It should be noted that, as described later, the (A) component may contain an aromatic polycarbonate resin (A-2) other than the (A-1) component to the extent not damaging the effects of the present invention.

<Polycarbonate-Polyorganosiloxane Copolymer (A-1)>

The PC-POS (A-1) is a polycarbonate-polyorganosiloxane copolymer having a polycarbonate block consisting of a repeating unit represented by the following general formula (I) and a polyorganosiloxane block containing a repeating unit represented by the following general formula (II).

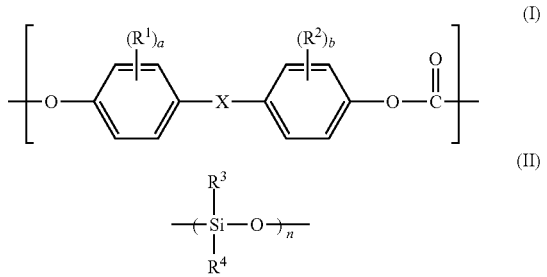

[In the formulae, R$^1$ and R$^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—; R$^3$ and R$^4$ each independently represent a hydrogen atom, a halogen atom, an alkyl group having 1 to 6 carbon atoms, an alkoxy group having 1 to 6 carbon atoms, or an aryl group having 6 to 12 carbon atoms; a and b each independently represent an integer of 0 to 4; and n represents an average repeating number.]

One kind of the PC-POS (A-1) may be used alone, or two or more kinds thereof may be used in combination. In addition, the repeating unit represented by the general formula (I) in the PC-POS (A-1) may be only one kind, or two or more kinds, or a copolymer of two or more kinds. The same is applied to the repeating unit represented by the general formula (II) in the PC-POS (A-1).

Examples of the halogen atom that R$^1$ and R$^2$ in the general formula (I) each independently represent include a fluorine atom, a chlorine atom, a bromine atom, and an iodine atom.

Examples of the alkyl group that R$^1$ and R$^2$ each independently represent include a methyl group, an ethyl group, a n-propyl group, an isopropyl group, various butyl groups ("various" means that a linear group and any branched group are included, and the same shall apply hereinafter), various pentyl groups, and various hexyl groups. An example of the alkoxy group that R$^1$ and R$^2$ each independently represent is an alkoxy group whose alkyl group moiety is the alkyl group described above.

R$^1$ and R$^2$ each represent preferably an alkyl group having 1 to 4 carbon atoms or an alkoxy group having 1 to 4 carbon atoms.

Examples of the alkylene group represented by X include a methylene group, an ethylene group, a trimethylene group, a tetramethylene group, and a hexamethylene group, while an alkylene group having 1 to 5 carbon atoms is preferable. Examples of the alkylidene group represented by X include an ethylidene group and an isopropylidene group. Example of the cycloalkylene group represented by X is preferably a cycloalkylene group having 5 to 10 carbon atoms, wherein a cyclopentanediyl group, a cyclohexanediyl group, a cyclooctanediyl group, and the like may be mentioned. Examples of the cycloalkylidene group represented by X include a cyclohexylidene group, a 3,5,5-trimethylcyclohexylidene group, and a 2-adamantylidene group, wherein a cycloalkylidene group having 5 to 10 carbon atoms is preferable, while a cycloalkylidene group having 5 to 8 carbon atoms is more preferable. Examples of the aryl moiety of the arylalkylene group represented by X include an aryl group having 6 to 14 ring-forming carbon atoms such as a phenyl group, a naphthyl group, a biphenyl group, and an anthryl group. Examples of the aryl moiety of the arylalkylidene group represented by X include an aryl group having 6 to 14 ring-forming carbon atoms such as a phenyl group, a naphthyl group, a biphenyl group, and an anthryl group.

In the formula, a and b each independently represent an integer of 0 to 4, preferably from 0 to 2, while more preferably 0 or 1.

Examples of the halogen atom that R$^3$ and R$^4$ in the general formula (II) each independently represent include a fluorine atom, a chlorine atom, a bromine atom, and an iodine atom. Examples of the alkyl group or alkoxy group that R$^3$ and R$^4$ each independently represent include the same examples as those in the case of R$^1$ and R$^2$. Examples of the aryl group that R$^3$ and R$^4$ each independently represent include a phenyl group and a naphthyl group.

It should be noted that R$^3$ and R$^4$ each preferably represent a hydrogen atom, an alkyl group having 1 to 6 carbon atoms, an alkoxy group having 1 to 6 carbon atoms, or an aryl group having 6 to 12 carbon atoms, while each represents more preferably a methyl group.

In the general formula (II), n represents an average repeating number, wherein n is preferably an integer of 30 to 500, more preferably an integer of 30 to 150, while still more preferably an integer of 30 to 120. If the average repeating number n is 30 or more, the molded article and the coated molded article thereby obtained have better shock resistances. If the average repeating number n is 500 or less, a difficulty in handling during the time of production of the copolymer can be readily avoided, this difficulty can be caused by an excessively high viscosity of the raw material POS.

The structure of the polyorganosiloxane block containing the repeating structure represented by the general formula (II) is preferably the one represented by the following general formula (II').

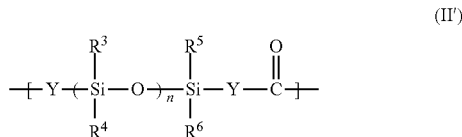

(II')

In the formula (II'), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; Y represents a single bond, —C(=O)—, or a divalent organic residual group containing an aliphatic or aromatic group; and n represents an average repeating number.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms. Y preferably represents a residual group of a phenol-based compound having an alkyl group, and more preferably represents an organic residual group derived from allylphenol or an organic residual group derived from eugenol.

In addition, the structure of the polyorganosiloxane block containing the repeating structure represented by the general formula (II) is preferably also the one represented by the following general formula (II").

A viscosity-average molecular weight (Mv) of the PC-POS (A-1) is preferably in the range of 10,000 to 30,000, more preferably in the range of 12,000 to 28,000, while still more preferably in the range of 15,000 to 25,000. If the viscosity-average molecular weight of the (A-1) component falls within this range, a fluidity and a shock resistance can be readily balanced.

It should be noted that in the present invention the viscosity-average molecular weight (Mv) is a value calculated from Schnell's equation ($[\eta]=1.23\times10^{-5}\times Mv^{0.83}$) by measuring the limiting viscosity [η] of its methylene chloride solution at 20° C. with an Ubbelohde-type viscometer.

The method of producing the PC-POS (A-1) is not particularly limited, and the PC-POS can be easily produced with reference to a known production method for a PC-POS such as a method described in Japanese Patent Laid-Open Publication No. 2010-241943.

Specifically, the PC-POS copolymer can be produced by: dissolving an aromatic polycarbonate oligomer produced in advance and the polyorganosiloxane having an reactive group in its terminal (such as polyorganosiloxanes represented by the following general formulae (2) and (3)) into a water-insoluble organic solvent (such as methylene chloride); adding an alkaline compound aqueous solution (such as an aqueous sodium hydroxide) of a dihydric phenol represented by the following general formula (1) (such as

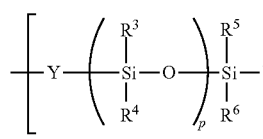 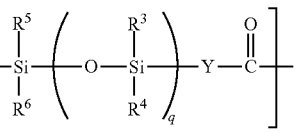

(II")

In the formula (II"), $R^3$ to $R^6$ and Y represent the same as those in the general formula (II'), and the same is applied to the preferable examples thereof; and the sum of p and q is n, wherein p and q each represent preferably n/2.

In this formula, m represents 0 or 1.

Z' represents a single bond, —$R^7$O—, —$R^7$COO—, —$R^7$NH—, —COO—, or —S—, wherein $R^7$ represents a linear, branched, or cyclic alkylene group, an aryl-substituted alkylene group optionally having an alkoxy group on the aromatic ring thereof, an arylene group, or a diarylene group. Specific examples of $R^7$ will be described later.

Also, β represents a divalent group derived from a diisocyanate compound, a divalent group derived from a dicarboxylic acid, or a divalent group derived from a halogenated dicarboxylic acid. Specific examples of the divalent group derived from a diisocyanate compound, the divalent group derived from a dicarboxylic acid, and the divalent group derived from a halogenated dicarboxylic acid will be described later.

A content of the polyorganosiloxane block moiety containing a repeating unit represented by the general formula (II) in the PC-POS (A-1) is preferably in the range of 0.75 to 15% by mass, more preferably in the range of 2.0 to 13% by mass, still more preferably in the range of 2.5 to 10% by mass, while especially preferably in the range of 3.0 to 8.0% by mass. If the content is 0.75% or more by mass, the molded article and the coated molded article thereby obtained have better shock resistances. If the content is 15% or less by mass, a handling during the time of production of the PC-POS (A-1) becomes better.

bisphenol A) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a molecular weight modifier (terminal stopper) (monohydric phenol such as p-t-butylphenol). It should be noted that by controlling the use amount of the polyorganosiloxane or by some other methods like this, the content of the polyorganosiloxane block moiety containing the repeating unit represented by the general formula (II) in the PC-POS (A-1) component can be controlled.

After the interfacial polycondensation reaction, the resultant is appropriately left at rest to be separated into an aqueous phase and a water-insoluble organic solvent phase [separating step], the water-insoluble organic solvent phase is washed (preferably washed with a basic aqueous solution, an acidic aqueous solution, and water in the stated order) [washing step], and the resultant organic phase is concentrated [concentrating step], pulverized [pulverizing step], and dried [drying step]. Thus, the PC-POS can be obtained. By controlling the use ratio of the PC-POS (A-1) component whose content of the polyorganosiloxane block is controlled to the polycarbonate resin (A) containing an aromatic polycarbonate resin (A-2) other than (A-1), the content of the polyorganosiloxane block moiety in the (A) component can be controlled.

In addition, the PC-POS can be produced by copolymerizing a dihydric phenol represented by the following general formula (1), a polyorganosiloxane represented by the following general formula (2), and phosgene, a carbonate ester, or a chloroformate.

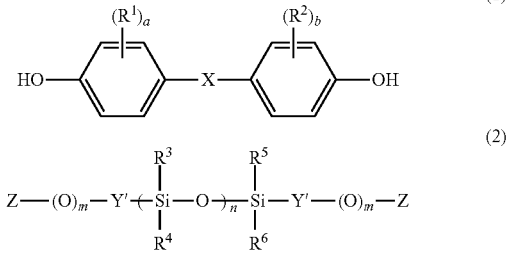

Here, in the general formula (1), $R^1$ and $R^2$, X, a, and b are the same as those in the general formula (I), and in the general formula (2), $R^3$ to $R^6$ are the same as those in the general formula (II'), n is the same as that in the general formula (II), and Y' is the same as Y in the general formula (II').

In the formula (2), m represents 0 or 1, and Z represents a halogen atom, $-R^7OH$, $-R^7COOH$, $-R^7NH_2$, $-R^7NHR^8$, $-COOH$, or $-SH$, wherein $R^7$ represents a linear, branched, or cyclic alkylene group, an aryl-substituted alkylene group optionally having an alkoxy group on the aromatic ring thereof, an arylene group, or a diarylene group, and also $R^8$ represents an alkyl group, an alkenyl group, an aryl group, an aralkyl group, or an alkoxy group.

The diarylene group refers to the group having two arylene groups bonded directly or via a divalent organic group, and it specifically refers to a group having a structure represented by $-Ar^1-W-Ar^2-$. It should be noted that $Ar^1$ and $Ar^2$ represent an arylene group; and W represents a single bond, or a divalent organic group. Specific examples and preferable examples of W are the same as those of X in the general formula (I).

Examples of the linear or branched alkylene group represented by $R^7$ include an alkylene group having 1 to 8 carbon atoms, while preferably 1 to 5 carbon atoms, and examples of the cyclic alkylene group thereof include a cycloalkylene group having 5 to 15 carbon atoms, while preferably 5 to 10 carbon atoms. Examples of the alkylene moiety of the aryl-substituted alkylene group represented by $R^7$ include an alkylene group having 1 to 8 carbon atoms, while preferably 1 to 5 carbon atoms. Examples of the aryl moiety of the aryl-substituted alkylene group represented by $R^7$ include an aryl group having 6 to 14 ring forming carbon atoms, such as a phenyl group, a naphthyl group, a biphenyl group, and an anthoryl group. Examples of the arylene group represented by $R^7$, $Ar^1$, and $Ar^2$ include an arylene group having 6 to 14 ring forming carbon atoms, such as a phenylene group, a naphthylene group, a biphenylene group, and an anthorylene group.

Preferably, Y' represents a single bond, or a divalent organic residual group containing $-C(=O)-$, an aliphatic group, or an aromatic group, and bonded to Si and O or to Si and Z. Preferably, $R^3$ to $R^6$ each represent a hydrogen atom, an alkyl group having 1 to 6 carbon atoms, an alkoxy group having 1 to 6 carbon atoms, or an aryl group having 6 to 12 carbon atoms. In the formula, n represents the same as before, and m represents 0 or 1.

Preferably, Z represents $-R^7OH$, $-R^7COOH$, $-R^7NH_2$, $-COOH$, or $-SH$, wherein $R^7$ represents the same as those defined before, and the same is applied to the preferable examples thereof.

Preferably, $R^8$ represents an alkyl group, an alkenyl group, an aryl group, or an aralkyl group.

The dihydric phenol represented by the general formula (1) as a raw material for the PC-POS is not particularly limited, but is suitably 2,2-bis(4-hydroxyphenyl)propane [trivial name: bisphenol A]. When bisphenol A is used as the dihydric phenol, in the resultant PC-POS, X represents an isopropylidene group and a=b=0 in the general formula (I).

Examples of the dihydric phenol except bisphenol A include: bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

One kind of those dihydric phenols may be used alone, or two or more kinds thereof may be used as a mixture.

The polyorganosiloxane represented by the general formula (2) can be easily produced by subjecting a phenol having an olefinic unsaturated carbon-carbon bond (preferably vinylphenol, allylphenol, eugenol, isopropenylphenol, or the like), to a hydrosilanation reaction with a terminal of a polyorganosiloxane chain having a predetermined polymerization degree (n; number of repetitions). The phenol is more preferably allylphenol or eugenol.

The polyorganosiloxane represented by the general formula (2) is preferably the one in which $R^3$ to $R^6$ each represent a methyl group.

Examples of the polyorganosiloxane represented by the general formula (2) include compounds represented by the following general formulae (2-1) to (2-10).

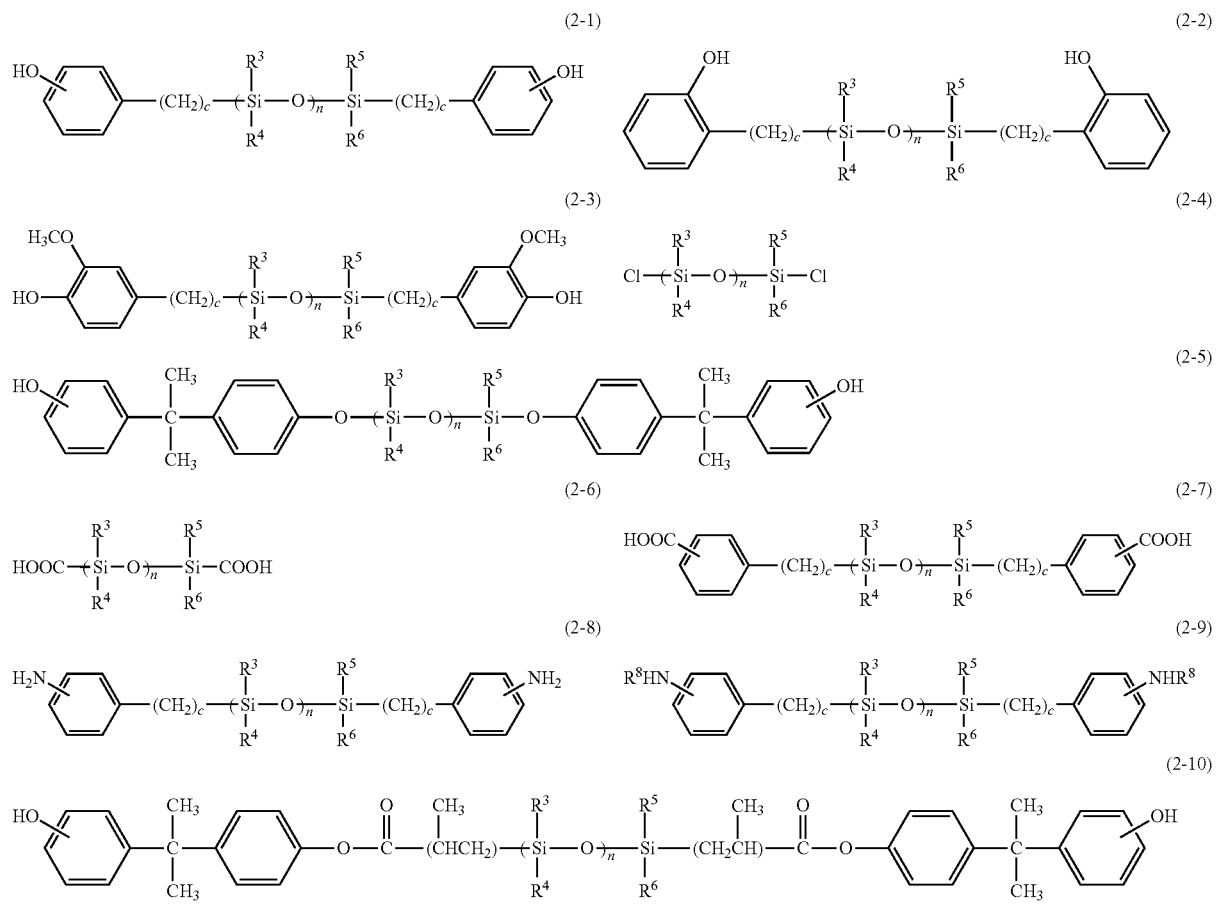

In the general formulae (2-1) to (2-10), $R^3$ to $R^6$, n, and $R^8$ represent the same as those defined before, and the same is applied to the preferable examples thereof. In the formulae, c represents a positive integer, while it usually represents an integer of 1 to 6.

Among them, a phenol-modified polyorganosiloxane represented by the general formula (2-1) is preferable from the viewpoint of its ease of polymerization. In addition, an α,ω-bis[3-(o-hydroxyphenyl)propyl]polydimethylsiloxane as one kind of compound represented by the general formula (2-2) or an α,ω-bis[3-(4-hydroxy-2-methoxyphenyl)propyl] polydimethylsiloxane as one kind of compound represented by the general formula (2-3) is preferable from the viewpoint of its ease of availability.

The phenol-modified polyorganosiloxane can be produced by a known method. For example, the following method is given as the production method.

First, cyclotrisiloxane and disiloxane are caused to react with each other in the presence of an acid catalyst to synthesize an α,ω-dihydrogen organopolysiloxane. At this time, an α,ω-dihydrogen polyorganosiloxane having a desired average repeating number can be synthesized by changing a blending ratio between cyclotrisiloxane and disiloxane. Next, the α,ω-dihydrogen polyorganosiloxane is subjected to an addition reaction with a phenol compound having an unsaturated aliphatic hydrocarbon group such as allylphenol or eugenol in the presence of a catalyst for a hydrosilylation reaction, whereby a phenol-modified polyorganosiloxane having a desired average repeating number can be produced.

In addition, at this stage, a cyclic polyorganosiloxane having a low molecular weight and an excessive amount of the phenol compound remain as impurities. Accordingly, those low-molecular weight compounds are preferably removed by distillation with heating under reduced pressure.

Further, the PC-POS may be a copolymer produced by copolymerizing the dihydric phenol represented by the general formula (1), a polyorganosiloxane represented by the following general formula (3), and phosgene, a carbonate ester, or a chloroformate. The polyorganosiloxane represented by the general formula (3) is a reaction product between the polyorganosiloxane represented by the general formula (2) and a diisocyanate, a dicarboxylic acid, or a halogenated dicarboxylic acid.

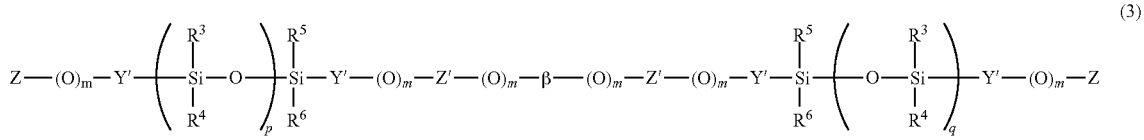

In the general formula (3), $R^3$ to $R^6$, m, p, q, Y', Z, and Z' represent the same as those defined before, and the same is applied to the preferable examples thereof. With regard to p and q in the general formula (3), it should be noted that the one with p=q, namely, the one with p=n/2 and q=n/2, may be mentioned as a preferable example thereof.

In addition, β represents a divalent group derived from a diisocyanate compound, a divalent group derived from a dicarboxylic acid, or a divalent group derived from a halogenated dicarboxylic acid; and divalent groups represented by the following general formulae (3-1) to (3-5) may be mentioned as the examples thereof.

(3-1)

(3-2)

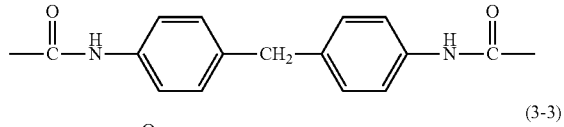
(3-3)

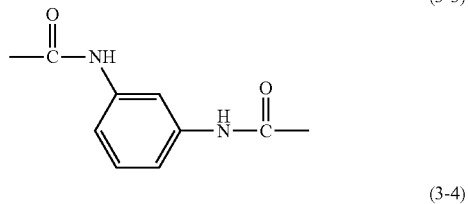
(3-4)

(3-5)

As discussed before, the (A) component may contain an aromatic polycarbonate resin (A-2) (hereinafter, this is sometimes referred to as "(A-2) component") other than the (A-1) component to the extent not damaging the effects of the present invention. The (A-2) component can be obtained by using an aromatic dihydric phenol-based compound, and can be used to control the content of the polyorganosiloxane block moiety containing the repeating unit represented by the general formula (II) in the (A) component.

The viscosity-average molecular weight (Mv) of the aromatic polycarbonate resin of the (A-2) component is preferably in the range of 10,000 to 30,000, more preferably in the range of 12,000 to 28,000, while still more preferably in the range of 15,000 to 25,000.

The aromatic polycarbonate resin (A-2) is preferably the one not having the repeating structure represented by the general formula (II) but containing the repeating unit represented by the following general formula (III) in its main chain. Such aromatic polycarbonate resin is not particularly limited, and any one of the various known aromatic polycarbonate resins can be used.

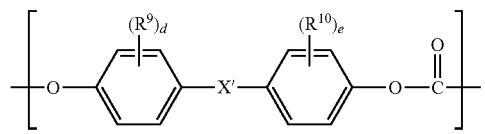
(III)

[In the formula, $R^9$ and $R^{10}$ each independently represent a halogen atom, an alkyl group having 1 to 6 carbon atoms, or an alkoxy group having 1 to 6 carbon atoms; X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—; and d and e each independently represent an integer of 0 to 4.]

Specific examples of $R^9$ and $R^{10}$ include the same examples as those of $R^1$ and $R^2$, and preferable ones thereof are also the same as those of $R^1$ and $R^2$. $R^9$ and $R^{10}$ each more preferably represent an alkyl group having 1 to 6 carbon atoms or an alkoxy group having 1 to 6 carbon atoms. Specific examples of X' include the same examples as those of X, and preferable ones thereof are also the same as those of X. In the formula, d and e each independently represent preferably from 0 to 2, more preferably 0 or 1.

Specifically, a resin obtained by a conventional production method for an aromatic polycarbonate can be used as the aromatic polycarbonate resin. Examples of the conventional method include: an interfacial polymerization method involving causing the aromatic dihydric phenol-based compound and phosgene to react with each other in the presence of an organic solvent inert to the reaction and an aqueous alkaline solution, adding a polymerization catalyst such as a tertiary amine or a quaternary ammonium salt to the resultant, and polymerizing the mixture; and a pyridine method involving dissolving the aromatic dihydric phenol-based compound in pyridine or a mixed solution of pyridine and an inert solvent, and introducing phosgene to the solution to directly produce the resin.

A molecular weight modifier (terminal stopper), a branching agent, or the like is used as required at the time of the reaction.

It should be noted that the aromatic dihydric phenol-based compound is, for example, a compound represented by the following general formula (HP).

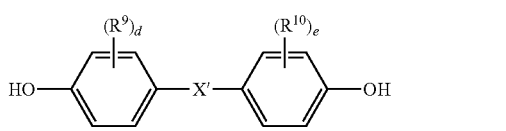
(III')

[In the formula, $R^9$, $R^{10}$, X', d, and e are the same as those defined before; and the same is applied to the preferable examples thereof.]

Specific examples of the aromatic dihydric phenol-based compound include bis(hydroxyphenyl)alkane-based dihydric phenols such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; and 4,4'-dihydroxydiphenyl, bis(4-hydroxyphenyl)cycloalkane, bis(4-hydroxyphenyl)

oxide, bis(4-hydroxyphenyl) sulfide, bis(4-hydroxyphenyl) sulfone, bis(4-hydroxyphenyl) sulfoxide, and bis(4-hydroxyphenyl) ketone.

Among them, bis(hydroxyphenyl)alkane-based dihydric phenols are preferable, and bisphenol A is more preferable.

One kind of the aromatic polycarbonate resins (A-2) may be used alone, or two or more kinds thereof may be used in combination.

The viscosity-average molecular weight (Mv) of the polycarbonate resin (A) is preferably in the range of 10,000 to 30,000, more preferably in the range of 12,000 to 28,000, while still more preferably in the range of 15,000 to 25,000. If the viscosity-average molecular weight of the (A) component falls within this range, the balance between a fluidity and a shock resistance can be better.

In view of controlling the content of the polyorganosiloxane block moiety in the (A) component preferably within the above-mentioned range, the content of the (A-1) component in the (A) component is preferably in the range of 5 to 100% by mass, more preferably in the range of 10 to 100% by mass, while still more preferably in the range of 15 to 100% by mass.

If the content of the (A-1) component is 5% or more by mass, there is no necessity to increase the content of the polyorganosiloxane block moiety in the (A-1) component; and hence, it is desirable in production of the PC-POS.

[Copolymer (B)]

The polycarbonate resin molding material for articles to be coated in the present invention contains, as the (B) component, a copolymer having a constituent unit derived from butadiene (hereinafter, this copolymer is sometimes referred to as simply "(B) component"). If the polycarbonate resin molding material for articles to be coated contains the (B) component, the shock resistance thereof can be enhanced, so that the polycarbonate resin molding material for articles to be coated having an excellent coating film adhesion without showing a significant decrease in the shock resistance even after a coating is made can be obtained.

In view of obtaining the above effects, preferably the (B) component contains at least one kind selected from a copolymer (B-1) having a constituent unit derived from butadiene, acrylonitrile, and styrene but not having a constituent unit derived from methyl methacrylate, and a copolymer (B-2) having a constituent unit derived from butadiene and methyl methacrylate, more preferably the (B) component contains at least the (B-1) component, while still more preferably the (B) component contains the (B-1) component and the (B-2) component. If the polycarbonate resin molding material for articles to be coated in the present invention contains, as the (B) component, both the (B-1) component and the (B-2) component, in addition to the polycarbonate resin (A) containing the (A-1) component, the shock resistance after the coating can be improved further.

With regard to the copolymer (B-1) having a constituent unit derived from butadiene, acrylonitrile, and styrene but not having a constituent unit derived from methyl methacrylate, acrylonitrile-butadiene-styrene terpolymer (ABS) is preferable.

Examples of commercially available ABS in the (B-1) component include Suntac AT-05 and Kuralastic SXH-330 (both are manufactured by Nippon A&L Inc.), Toyolac 500 and Toyolac 700 (both are manufactured by Toray Industries, Inc.), PA-756 (manufactured by Chimei Corporation), and HR 181 (manufactured by Kumho Petrochemical Co., Ltd.).

Also, examples of the copolymer (B-2) having the constituent unit derived from butadiene and methyl methacrylate include methyl methacrylate-butadiene-styrene terpolymer (MBS), methyl methacrylate-acrylonitrile-butadiene-styrene quarterpolymer (MADS), and methyl methacrylate-butadiene bipolymer (MB). In view of the shock resistance after the coating, the (B-2) component is preferably at least one kind selected from methyl methacrylate-butadiene-styrene terpolymer (MBS) and methyl methacrylate-butadiene bipolymer (MB), while more preferably MBS.

Examples of the commercially available MBS includes Metablen C223A (manufactured by Mitsubishi Rayon Co., Ltd.), Denka TH Polymer (manufactured by Denka Co., Ltd.), Kane Ace B (manufactured by Kaneka Corp.), and Paraloid EXL2620 (manufactured by Dow Chemical Company). Examples of the commercially available MARS include Denka CL Polymer, Denka TE Polymer, and Denka TP Polymer (all manufacture by Denka Co., Ltd.), Examples of the commercially available MB include Kane Ace M-711 (manufactured by Kaneka Corp.), and Paraloid EXL2603 and Paraloid EXL2690 (both manufactured by Dow Chemical Company).

These (B) components may be used alone, or two or more kinds thereof may be used in combination. Among them, in view of having a sufficiently high shock resistance even after a coating is made, the (B) component preferably contains ABS as the (B-1) component, while more preferably the (B) component contains the (B-1) component and the (B-2) component wherein the (B-1) component is ABS and the (B-2) component is MBS. Especially if ABS and MBS are used in combination, the coated molded article having an excellent shock resistance without causing a decrease in the shock resistance after the coating can be obtained.

In the polycarbonate resin molding material for articles to be coated in the present invention, the content of the (B) component relative to 100 parts by mass of the (A) component is preferably in the range of 8 to 125 parts by mass, more preferably in the range of 9 to 70 parts by mass, still more preferably in the range of 9 to 50 parts by mass, while especially preferably in the range of 25 to 45 parts by mass. If the content of the (B) component relative to 100 parts by mass of the (A) component is in the range of 8 to 125 parts by mass, the shock resistance after the coating becomes better.

In the polycarbonate resin molding material for articles to be coated in the present invention, the preferable content of each of the (B-1) component and the (B-2) component relative to 100 parts by mass of the (A) component is as following. If the content of each component falls within the following range, the shock resistances of the molded article and the coated molded article thereby obtained become better.

In the polycarbonate resin molding material for articles to be coated in the present invention, preferably, the content of the (B-1) component is in the range of 8 to 100 parts by mass and the content of the (B-2) component is in the range of more than 0 to 25 parts by mass, relative to 100 parts by mass of the (A) component. More preferably, the content of the (B-1) component is in the range of 8 to 50 parts by mass and the content of the (B-2) component is in the range of 1 to 20 parts by mass. Still more preferably, the content of the (B-1) component is in the range of 8 to 45 parts by mass and the content of the (B-2) component is in the range of 1 to 5 parts by mass. Especially preferably, the content of the (B-1) component is in the range of 24 to 40 parts by mass and the content of the (B-2) component is in the range of 1 to 5 parts by mass.

In the polycarbonate resin molding material for articles to be coated in the present invention, the content of the polyorganosiloxane block moiety containing the repeating unit represented by the general formula (II) is, relative to the entirety of the molding material, in the range of 0.50 to 10% by mass, preferably in the range of 0.50 to 8.0% by mass, more preferably in the range of 0.70 to 5.0% by mass, while still more preferably in the range of 0.70 to 2.0% by mass.

If the content thereof is less than 0.50% by mass, the shock resistances of the molded article and coated molded article thereby obtained become insufficient. Also, if the content thereof is 10% or less by mass, it is desirable in the economic point of view.

It should be noted that the content of the polyorganosiloxane block moiety in the molding material is the value calculated from the measurement of a nuclear magnetic resonance (NMR).

In addition, in the polycarbonate resin molding material for articles to be coated in the present invention, the content of the constituent unit derived from butadiene in the entirety of the molding material is in the range of 1 to 10% by mass. If the content of the constituent unit derived from butadiene is less than 1% by mass, the shock resistances of the molded article and coated molded article thereby obtained become insufficient; on the other hand, if the content thereof is more than 10% by mass, a fluidity of the molding material decreases. In view of the above, in the polycarbonate resin molding material for articles to be coated in the present invention, the content of the constituent unit derived from butadiene in the entirety of the molding material is preferably in the range of 2 to 9% by mass, while more preferably in the range of 3 to 8% by mass.

The polycarbonate resin molding material for articles to be coated in the present invention may contain a resin component other than the (A) component and the (B) component to the extent not damaging the effects of the present invention. Examples of the resin component like this include acrylonitrile-styrene bipolymer (AS), acrylonitrile-acrylate ester-styrene terpolymer (AAS), and acrylonitrile-(ethylene/propylene/diene copolymer)-styrene copolymer (AES).

[Other Components]

In the polycarbonate resin molding material for articles to be coated in the present invention may contain, as required, various other components to the extent not significantly damaging the effects of the present invention.

Examples of the other component include additives such as an antioxidant, a UV absorber, a release agent, a flame retardant, a flame retardant adjuvant, an inorganic filler, and a coloring material (dye and pigment).

<Method for Producing the Polycarbonate Resin Molding Material for Articles to be Coated>

Next, the method for producing the polycarbonate resin molding material for articles to be coated in the present invention will be explained.

The polycarbonate resin molding material for articles to be coated in the present invention can be obtained by blending and kneading the (A) component, the (B) component, and in addition, other additives to be used as required.

The blending and kneading can be performed by generally used methods, wherein, for example, preliminary mixing is carried out by using a usually used machine such as a ribbon blender and a drum tumbler, followed by kneading with a Henschel mixer, a Banbury mixer, a single-screw extruder, a twin-screw extruder, a multi-screw extruder, a Ko-Kneader, or the like.

The heating temperature at the time of kneading is generally selected from the range of 240 to 300° C. as required.

It should be note that alternatively the component other than the polycarbonate resin (A) may be added after it is melt kneaded with the polycarbonate resin (A) in advance; in other words, it can be added as a master batch thereof.

[Molded Article]

The molded article of the present invention contains the polycarbonate resin molding material for articles to be coated of the present invention.

The molded article of the present invention can be obtained in the way as following; that is, a raw material composition obtained by melt kneading the polycarbonate resin molding material for articles to be coated of the present invention by using the above-mentioned melt kneading molding machine is molded by an injection molding method, an injection compression molding method, an extrusion molding method, a blow molding method, a press molding method, a vacuum molding method, a foam molding method, or the like, or raw material pellets obtained from the said composition are molded by the methods described above.

The especially preferable method is as follows; that is, the molding raw material in the pellet form is produced by the above-mentioned melt kneading method, and then, the molded article is obtained by subjecting the pellets to an injection molding method or an injection compression molding method.

It should be noted that in the injection molding method, in order to avoid a sink or to save a weight, a gas injection molding method may also be employed.

The molded article of the present invention is excellent in the shock resistance, the coating film adhesion, and the solvent resistance. With regard to the shock resistance of the molded article, specifically in a test piece having a thickness of 1 mm, number of the test piece having a crack formed therein is preferably 1 or less when a falling weight impact test is carried out for 5 times under the conditions of temperature of 23° C., an impact head diameter of 12.7 mm, a receiving block diameter of 48 mm, a falling weight of 500 g, and a falling height of 100 cm, while the number is more preferably 0. The shock resistance test of the article can be done specifically by the method described in Examples.

[Coated Molded Article]

The coated molded article of the present invention is the one obtained by coating the molded article of the present invention. There is no particular limit in the coating method, therefore examples thereof include a roll coating, a curtain flow coating, a soaking method, a spray coating, an electrostatic coating, an electrodeposition coating, and a UV coating. Alternatively, methods such as a plating method and a vapor deposition method may be used.

Also there is no particular limit in the coating material to be used for coating; and hence, the coating material can be arbitrarily selected in accordance with the coating method, the shape of the coated molded article, and the like. For example, a resin coating material containing a coloring material, various resin components such as an epoxy resin, a urethane resin, a phenol resin, and an acryl resin, and water or an organic solvent may be used. The resin component may be a thermosetting resin containing a main agent and a hardening agent. In addition, in view of mass production of the coated molded article, a coating material containing an organic solvent is preferable.

It should be noted that if the molded article of the polycarbonate resin is coated with a coating material containing an organic solvent, there is a tendency that the shock resistance of the molded article after the coating deteriorates due to the effect of the organic solvent and so forth.

Especially if the organic solvent contained in the coating material is at least one kind selected from a ketone-based solvent and an ester-based solvent, these solvents have an action of penetrating into the molded article; and hence, decrease of the shock resistance in the molded article is substantial. However, in the molded article of the polycarbonate resin molding material for articles to be coated according to the present invention, even if the coating is made thereto by using the coating material containing, as the organic solvent, at least one kind selected from a ketone-based solvent and an ester-based solvent, there is a remarkable effect that the significant decrease in the shock resistance does not take place. Accordingly, the molded article can be made thinner without worrying about decrease in the shock resistance due to the coating; and thus, downsizing and lightening can be achieved in various products to which the coated molded article of the present invention is applied, such as housings of a smart phone, a tablet personal computer, and a note-type personal computer, as well as an automobile interior part, an automobile exterior part, and other uses such as a mobile electric product including a radio-cassette recorder.

In addition, especially in the automobile part, a sharp destruction surface caused by the shock of collision or the like can become a serious problem in safety; and hence, a high shock resistance not causing a crack but rather staying in deformation is required even if a shock is given to the coated molded article after the coating. From this view point, in the coated molded article of the present invention, in a test piece having a thickness of 1 mm, number of the test piece having a crack formed therein is preferably 1 or less when a falling weight impact test is carried out for 5 times under the conditions of temperature of 23° C., an impact head diameter of 12.7 mm, a receiving block diameter of 48 mm, a falling weight of 500 g, and a falling height of 100 cm, while the number is more preferably 0. The shock resistance test of the coated molded article can be done in the same way as the shock resistance test of the molded article.

The thickness of the coating film in the coated molded article is not particularly limited, while it is usually in the range of 0.1 to 100 µm. In view of avoiding a crack and so forth caused by an excessive thickness of the coating film, the thickness of the coating film is preferably in the range of 0.1 to 50 µm, while more preferably in the range of 0.1 to 20 µm.

The polycarbonate resin molding material for articles to be coated according to the present invention, the molded article containing the same, and the coated molded article thereof can be suitably used in housings of a smart phone, a tablet, and a note-type personal computer, as well as an automobile interior part, an automobile exterior part, and other uses such as a mobile electric product including a radio-cassette recorder.

EXAMPLES

The present invention is described in more detail by way of Examples. However, the present invention is by no means limited by these Examples.

Preparation Example 1

<Production of Polycarbonate Oligomer>

Sodium dithionite in an amount of 2,000 ppm with respect to bisphenol A (BPA) to be dissolved later was added to a 5.6% by mass aqueous sodium hydroxide; and then bisphenol A was dissolved in the mixture such that the concentration of bisphenol A might become 13.5% by mass, whereby an aqueous sodium hydroxide solution of bisphenol A was prepared.

The aqueous sodium hydroxide solution of bisphenol A thus obtained, methylene chloride, and phosgene each were continuously passed through a tubular reactor having an inner diameter of 6 mm and a tube length of 30 m at the respective flow rates of 40 L/hr (hereinafter, L is an abbreviation of liter), 15 L/hr, and 4.0 kg/hr.

The tubular reactor had a jacket portion, and the temperature of the reaction solution was kept at 40° C. or less by passing cooling water through the jacket.

The reaction solution that had exited the tubular reactor was continuously introduced into a baffled vessel type reactor provided with a sweptback blade and having an internal volume of 40 L. The aqueous sodium hydroxide solution of bisphenol A, a 25% by mass aqueous sodium hydroxide, water, and a 1% by mass aqueous solution of triethylamine each were further added to the reactor at the respective flow rates of 2.8 L/hr, 0.07 L/hr, 17 L/hr, and 0.64 L/hr to perform a reaction.

An aqueous phase was separated and removed by continuously taking out the reaction solution overflowing the vessel type reactor and leaving the reaction solution at rest. Then, a methylene chloride phase was collected.

The polycarbonate oligomer thus obtained had a concentration of 329 g/L and a chloroformate group concentration of 0.74 mol/L.

Production Example 1

<Production of Polycarbonate-Polydimethylsiloxane Copolymer (PC-PDMS Copolymer 1)>

15 L of the polycarbonate oligomer solution produced in Preparation Example 1, 9.0 L of methylene chloride, 384 g of an o-allylphenol-terminal-modified polydimethylsiloxane (PDMS) having 90 as an average repeating number (n) of a dimethylsiloxane repeating unit, and 8.8 mL of triethylamine were charged into a 50-L vessel type reactor provided with a baffle board, a paddle type stirring blade, and a cooling jacket. Then, 1,389 g of a 6.4% by mass aqueous sodium hydroxide was added to the mixture under stirring to perform a reaction between the polycarbonate oligomer and the allylphenol-terminal-modified PDMS for 10 minutes.

A solution of p-t-butylphenol (PTBP) in methylene chloride (prepared by dissolving 137 g of PTBP in 2.0 L of methylene chloride) and an aqueous sodium hydroxide solution of bisphenol A (prepared by dissolving 1,012 g of bisphenol A in an aqueous solution prepared by dissolving 577 g of NaOH and 2.0 g of sodium dithionite in 8.4 L of water) were added to the polymerization solution to perform a polymerization reaction for 50 minutes.

Then, 10 L of methylene chloride was added to the resultant for dilution, and then the mixture was stirred for 10 minutes. After that, the mixture was separated into an organic phase containing polycarbonate-polydimethylsiloxane copolymer (PC-PDMS copolymer) and an aqueous phase containing excess amounts of bisphenol A and NaOH; and then, the organic phase was isolated.

The solution of the PC-PDMS copolymer in methylene chloride thus obtained was sequentially washed with a 0.03 mol/L aqueous NaOH and a 0.2 mol/L hydrochloric acid in amounts of 15% by volume each with respect to the solution. Next, the solution was repeatedly washed with pure water until an electric conductivity in the aqueous phase after the washing became 0.01 µS/m or less.

The solution of the PC-PDMS copolymer in methylene chloride obtained by the washing was concentrated and pulverized; and then, the resultant flakes were dried under reduced pressure at 120° C. thereby obtaining a PC-PDMS copolymer 1.

The resultant PC-PDMS copolymer 1 had the PDMS block moiety amount determined by the nuclear magnetic resonance (NMR) measurement of 6.0% by mass, a viscosity number of 47.5, and a viscosity-average molecular weight Mv of 17,700.

[Performance Evaluation]
<Evaluation of Coating Film Adhesion>

The surface of the coated test piece was cut vertically and horizontally by a cutter knife with the distance of 2 mm among the cuts to form a lattice pattern having 25 lattices; and after a cellophane tape was adhered to the lattice pattern, the edge of the tape was pulled up at once to the direction of 60 degree, and then the state of the lattice pattern was confirmed. It should be noted that as to the cutter knife an Olfa cutter spare blade (small) (manufactured by Olfa Corp.) was used, and as to the cellophane tape a cellophane tape CT-18 (manufactured by Nichiban Co., Ltd.) was used.

In Table 1, when there was no change in the lattice pattern, it was judged that the coating film adhesion was good.

<Evaluation of the Shock Resistance Characteristics>

The evaluation was carried out with regard to the molded article before the coating and after the coating, respectively. In a test piece having a thickness of 1 mm, a falling weight impact test was carried out for 5 times under the conditions of temperature of 23° C., an impact head diameter of 12.7 mm, a receiving block diameter of 48 mm, a falling weight of 500 g, and a falling height of 100 cm; and the number of the test piece having a crack formed therein is shown in Table 1. If the number of the test piece having a crack is smaller, it shows that it has a better shock resistance.

Examples 1 to 2 and Comparative Examples 1 to 4

Components each were mixed in the ratio shown in Table 1, and the resultant mixture was granulated at the resin temperature of 280° C. by using a vented single-screw extruder having a diameter of 50 mm to obtain pellets containing the polycarbonate resin molding material for articles to be coated.

The pellets thus obtained were injection molded by using an injection molding machine (IS 100EN Type, manufactured by Toshiba Machine Co., Ltd.) under the molding conditions of the cylinder temperature of 240° C. and the die temperature of 40° C. to obtain various test pieces for evaluation.

Then, to the test piece thus obtained was applied a coating material (main material: CPX 79 Silver, hardener: H-250, organic solvent: an ester-based solvent, and the ratio of main material/hardener/organic solvent=10/1/10 (mass ratio), manufactured by Musashi Paint Co., Ltd.) to obtain a coated test piece having a film with the thickness of 9±1 μm. It should be noted that the drying condition of the coating was the temperature of 80° C. for the duration time of 30 minutes.

By using the thus obtained test pieces before and after the coating, the before-mentioned performance evaluations were carried out. The results thereof are shown in Table 1.

Details of each component used in Examples and Comparative Examples shown in Table 1 are as follows.
<Polycarbonate-Polyorganosiloxane Copolymer (A-1)>
PC-PDMS copolymer 1 (polycarbonate-polyorganosiloxane copolymer described in Production Example 1).
<Aromatic Polycarbonate Resin (A-2)>
Tarflon FN1900 (bisphenol A polycarbonate with the viscosity number of 51.0 and the viscosity-average molecular weight Mv of 19,200, manufactured by Idemitsu Kosan Co., Ld.).
<Copolymer (B-1)>
Suntac AT-05 (acrylonitrile-butadiene-styrene terpolymer (ABS), manufactured by Nippon A&L Inc.).
<Copolymer (B-2)>
Kane Ace M-701 (methyl methacrylate-butadiene-styrene terpolymer (MBS), manufactured by Kaneka Corp.)

TABLE 1

|  |  | Example 1 | Example 2 | Comparative Example 1 | Comparative Example 2 | Comparative Example 3 | Comparative Example 4 |
|---|---|---|---|---|---|---|---|
| Composition of the molding material | (A-1) PC-PDMS (parts by mass) | 20 | 21 | 0 | 15 | 0 | 0 |
| | (A-2) PC (parts by mass) | 80 | 79 | 100 | 85 | 100 | 100 |
| | (B-1) ABS (parts by mass) | 33 | 33 | 0 | 0 | 33 | 33 |
| | (B-2) MBS (parts by mass) | 0 | 3 | 0 | 0 | 0 | 3 |
| | Viscosity-average molecular weight (Mv) of the (A) component | 18,900 | 18,900 | 19,200 | 19,000 | 19,200 | 19,200 |
| | Content of POS block moiety in entire molding material (% by mass) | 0.9 | 0.9 | 0 | 0.9 | 0 | 0 |
| | Content of the structure unit derived from butadiene in entire molding material (% by mass) | 3.5 | 5.2 | 0 | 0 | 3.5 | 5.2 |
| Evaluation results | Coating film adhesion (state of the lattice pattern) | Good | Good | Good | Good | Good | Good |
| | Shock resistance before coating (number of cracked piece/5 pieces) | 0 | 0 | 0 | 0 | 0 | 0 |
| | Shock resistance after coating (number of cracked piece/5 pieces) | 1 | 0 | 5 | 3 | 4 | 4 |

From the comparison between Example 1 and Comparative Example 1, it can be seen that in the molded article of the polycarbonate resin molding material which was made to contain not only the (A-1) component having the prescribed content of the POS block moiety but also the (B) component, the number of the test piece having a crack formed therein measured by the shock resistance characteristic test after the coating was decreased by 4 pieces.

On the other hand, from the comparison between Comparative Example 1 and Comparative Example 2, it can be seen that in the molded article of the polycarbonate resin molding material not containing the (B) component, even if it was made to contain the (A-1) component, the number of the test piece having a crack formed therein measured by the shock resistance characteristic test after the coating was decreased only by 2 pieces. In addition, from the comparison between Comparative Example 1 and Comparative Example 3, it can be seen that in the molded article of the polycarbonate resin molding material not containing the (A-1) component, even if it was made to contain the (B) component, the number of the test piece having a crack formed therein measured by the shock resistance characteristic test after the coating was decreased only by 1 piece.

From the above, it can be seen that when the polycarbonate resin molding material is made to contain the (A-1) component having the POS block moiety and the (B) component at the same time, the shock resistance thereof after the coating improves significantly as compared with the case that the molding material is made to contain each of them independently and separately.

In addition, from the comparison between Example 1 and Example 2, in the molded article of the polycarbonate resin molding material which contains the (A-1) component having the prescribed content of the POS block moiety, if in addition to ABS, i.e., the (B-1) component, MBS, i.e., the (B-2) component, is contained therein, the number of the test piece having a crack formed therein measured by the shock resistance characteristic test after the coating was further decreased by 1 piece, indicating that the shock resistance after the coating improves further more. On the other hand, from the comparison between Comparative Example 3 and Comparative Example 4, in the molded article of the polycarbonate resin molding material not containing the (A-1) component, the number of the test piece having a crack formed therein measured by the shock resistance characteristic test after the coating is not decreased even if in addition to ABS, MBS is further contained therein.

From the above, it can be seen that when the (A-1) component, and simultaneously the (B-1) component and the (B-2) component are contained therein, the shock resistance thereof after the coating further improves significantly as compared with the case that the molding material contains each of them independently and separately.

As discussed above, the polycarbonate resin molding material for articles to be coated of the present invention has an excellent coating film adhesion without showing significant deterioration of a shock resistance even after the coating is made thereto.

INDUSTRIAL APPLICABILITY

According to the polycarbonate resin molding material for articles to be coated of the present invention, even a thin molded article thereof has an excellent shock resistance after the coating is made, so that downsizing and lightening can be made in various molded articles thereof and hence, it can be suitably used in housings of a smart phone, a tablet, and a note-type personal computer, as well as an automobile interior part, an automobile exterior part, and other uses such as a mobile electric product including a radio-cassette recorder.

The invention claimed is:

1. A polycarbonate resin molding material capable of being coated, comprising:
   a polycarbonate resin (A) comprising a polycarbonate-polyorganosiloxane copolymer (A-1) which has a polycarbonate block consisting of a repeating unit represented by the following general formula (I) and a polyorganosiloxane block comprising a repeating unit represented by the following general formula (II); and
   a copolymer (B) having a constituent unit derived from butadiene,
   wherein the copolymer (B) comprises a copolymer (B-1) having a constituent unit derived from butadiene, acrylonitrile and styrene, but not having a constituent unit derived from methyl methacrylate, and a copolymer (B-2) having a constituent unit derived from butadiene and methyl methacrylate, and
   wherein a content of the copolymer (B-1) is in the range of 8 to 100 parts by mass and a content of the copolymer (B-2) is in the range of more than 0 part by mass to 25 or less parts by mass, with both contents being relative to 100 parts by mass of the polycarbonate resin (A),
   wherein a content of the polyorganosiloxane block moiety in entirety of the molding material is in the range of 0.50 to 10% by mass and a content of the constituent unit derived from butadiene in entirety of the molding material is in the range of 1 to 10% by mass, provided that in the formulae, $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—; $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms; a and b each independently represent an integer of 0 to 4; and n represents an average repeating number

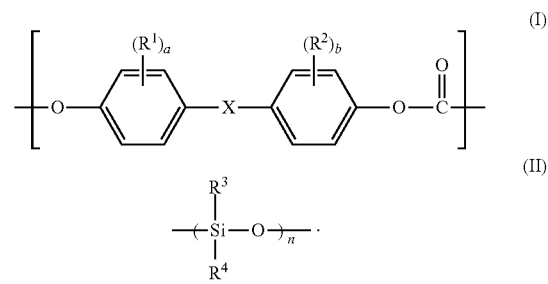

2. The polycarbonate resin molding material according to claim 1, wherein a content of the polyorganosiloxane block moiety comprising the repeating unit represented by the general formula (II) in the copolymer (A-1) is in the range of 0.75 to 15% by mass.

3. The polycarbonate resin molding material according to claim 1, wherein the copolymer (B-1) is acrylonitrile-butadiene-styrene terpolymer (ABS).

4. The polycarbonate resin molding material according to claim 1, wherein the copolymer (B-2) is at least one kind selected from methyl methacrylate-butadiene-styrene terpolymer (MBS) and methyl methacrylate-butadiene bipolymer (MB).

5. A molded article comprising the polycarbonate resin molding material capable of being coated according to claim 1.

6. A coated molded article, wherein a coating is made onto the molded article according to claim 5.

7. The coated molded article according to claim 6, wherein the coating is made by using a coating material comprising an organic solvent.

8. The coated molded article according to claim 7, wherein the organic solvent is at least one kind selected from a ketone-based solvent and an ester-based solvent.

9. The coated molded article according to claim 6, wherein in a test piece having a thickness of 1 mm, number of the test piece having a crack formed therein is 1 or less when a falling weight impact test is carried out for 5 times under conditions of temperature of 23° C., an impact head diameter of 12.7 mm, a receiving block diameter of 48 mm, a falling weight of 500 g, and a falling height of 100 cm.

* * * * *